United States Patent
Kuwako et al.

(10) Patent No.: US 9,729,619 B2
(45) Date of Patent: Aug. 8, 2017

(54) INFORMATION PROCESSING SYSTEM, PROCESSING APPARATUS, AND DISTRIBUTED PROCESSING METHOD

(71) Applicant: NEC Corporation, Tokyo (JP)

(72) Inventors: Shizuho Kuwako, Tokyo (JP); Nobutatsu Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 331 days.

(21) Appl. No.: 14/488,708

(22) Filed: Sep. 17, 2014

(65) Prior Publication Data

US 2015/0088976 A1 Mar. 26, 2015

(30) Foreign Application Priority Data

Sep. 24, 2013 (JP) ................ 2013-196634

(51) Int. Cl.
*G06F 15/16* (2006.01)
*G06F 11/00* (2006.01)
*H04L 29/08* (2006.01)
*G06F 11/20* (2006.01)

(52) U.S. Cl.
CPC .......... *H04L 67/10* (2013.01); *G06F 11/2028* (2013.01); *G06F 11/2038* (2013.01)

(58) Field of Classification Search
CPC ............... H04L 29/08072; H04L 29/06; H04L 29/0809; H04L 29/06047; G06Q 30/02; G06F 11/2038; G06F 11/2028; G06F 11/2097; G06F 11/2035; G06F 11/2025
USPC ....................................................... 709/203
See application file for complete search history.

(56) References Cited

U.S. PATENT DOCUMENTS

| | | | | |
|---|---|---|---|---|
| 6,035,417 A | * | 3/2000 | Kanazawa | G06F 11/2038 714/13 |
| 8,522,068 B2 | * | 8/2013 | Akirav | G06F 11/1456 709/223 |
| 2009/0013027 A1 | * | 1/2009 | Tanaka | G06F 21/10 709/203 |
| 2009/0240898 A1 | * | 9/2009 | Abe | G06F 3/0607 711/154 |

(Continued)

FOREIGN PATENT DOCUMENTS

JP 2000-267964 A 9/2000

*Primary Examiner* — Mahran Abu Roumi
(74) *Attorney, Agent, or Firm* — Wilmer Cutler Pickering Hale and Dorr LLP

(57) ABSTRACT

Even when processing object data includes confidential information, distributed processing can be performed. An apparatus determination unit 220 of a server apparatus 200 selects a client apparatus 100 or the server apparatus 200 as an apparatus which performs a predetermined process based on right information 251 indicating a right of a user of the client apparatus 100 to input data for the predetermined process. When the client apparatus 100 performs the predetermined process, a server side processing unit 230 transmits the input data to the client apparatus 100. When the server apparatus 200 performs the predetermined process, the server side processing unit 230 performs the predetermined process and transmits a processing result of the predetermined process to the client apparatus 100. When the client apparatus 100 performs the predetermined process, the client side processing unit 130 of the client apparatus 100 performs the predetermined process using the input data.

14 Claims, 10 Drawing Sheets

(56) References Cited

U.S. PATENT DOCUMENTS

| | | | |
|---|---|---|---|
| 2011/0022828 A1* | 1/2011 | Delaney | G06F 8/67 713/2 |
| 2011/0213934 A1* | 9/2011 | Greenhalgh | G06F 1/3293 711/146 |
| 2013/0067201 A1* | 3/2013 | Takeuchi | G06F 15/17337 712/216 |
| 2013/0204931 A1* | 8/2013 | Sakurai | H04L 47/38 709/203 |

* cited by examiner

251 RIGHT INFORMATION

|  | RIGHT | |
|---|---|---|
|  | ANALYSIS OBJECT DATA | RENDERING OBJECT DATA |
| USER A | y | y |
| USER B | n | y |
| USER C | n | n |
| ⋮ | ⋮ | ⋮ |

| RIGHT | | TAKE-OVER SUB PROCESS |
|---|---|---|
| ANALYSIS OBJECT DATA | RENDERING OBJECT DATA | |
| y | y | ANALYTICAL PROCESS |
| n | y | RENDERING PROCESS |
| OTHER CASE | | NOT APPLICABLE |

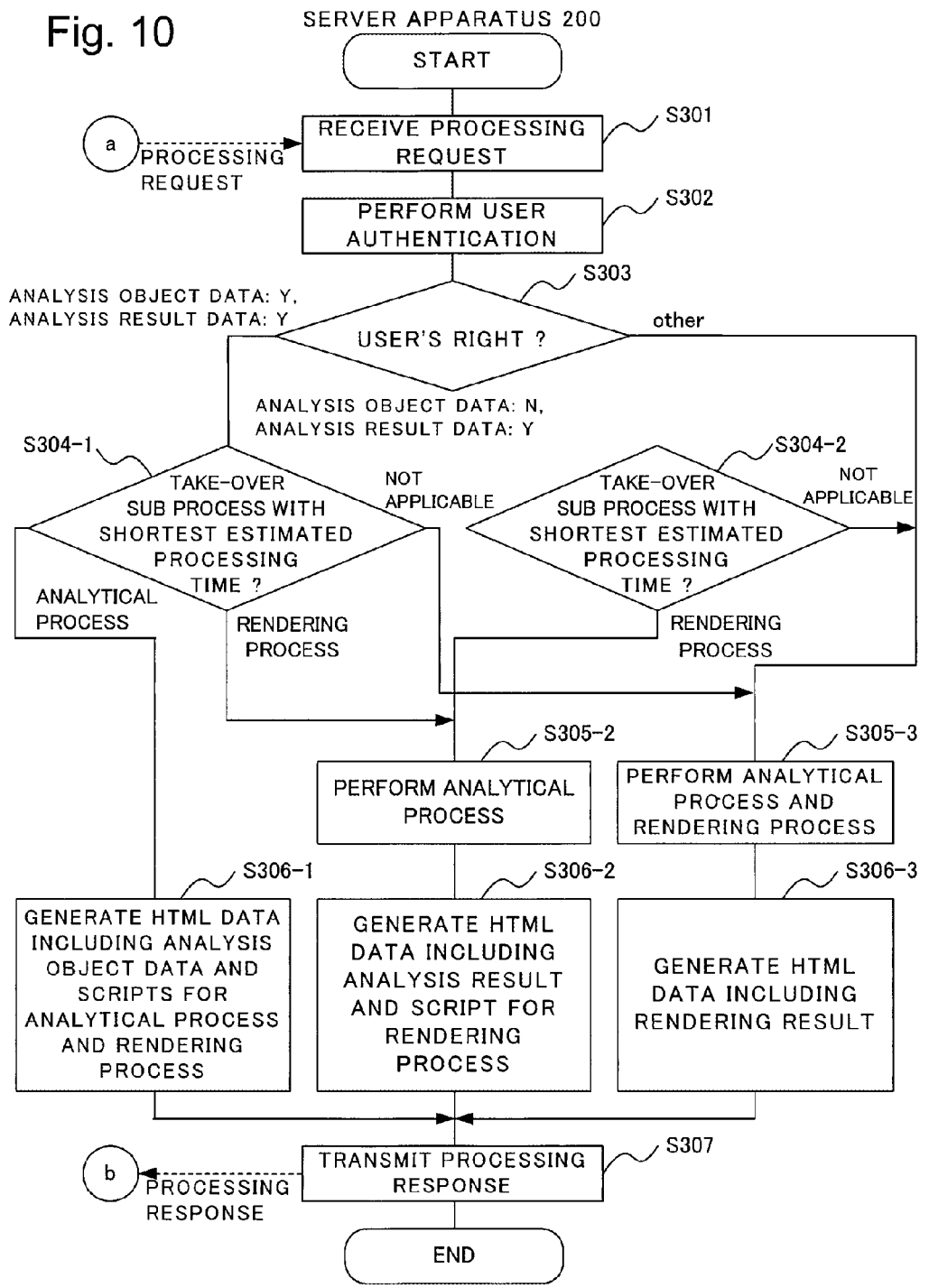

Fig. 11

| RIGHT | | CANDIDATE FOR TAKE-OVER SUB PROCESS |
|---|---|---|
| ANALYSIS OBJECT DATA | RENDERING OBJECT DATA | |
| y | y | ANALYTICAL PROCESS |
| | | RENDERING PROCESS |
| | | NOT APPLICABLE |
| n | y | RENDERING PROCESS |
| | | NOT APPLICABLE |
| OTHER CASE | | NOT APPLICABLE |

Fig. 12

| CANDIDATE FOR TAKE-OVER SUB PROCESS | PROCESSING TIME | | TRANSFER TIME | ESTIMATED PROCESSING TIME |
|---|---|---|---|---|
| | ANALYTICAL PROCESS | RENDERING PROCESS | | |
| ANALYTICAL PROCESS | (CLIENT) 15 sec | (CLIENT) 15 sec | (ANALYSIS OBJECT DATA) 20 sec | 50 sec |
| RENDERING PROCESS | (SERVER) 20 sec | (CLIENT) 15 sec | (RENDERING OBJECT DATA) 10 sec | 45 sec |
| NOT APPLICABLE | (SERVER) 20 sec | (SERVER) 20 sec | (RENDERING RESULT) 10 sec | 50 sec |

INFORMATION PROCESSING SYSTEM, PROCESSING APPARATUS, AND DISTRIBUTED PROCESSING METHOD

This application is based upon and claims the benefit of priority from Japanese Patent Application No. 2013-196634, filed on Sep. 24, 2013, the disclosure of which is incorporated herein in its entirety by reference.

TECHNICAL FIELD

The present invention relates to an information processing system, a processing apparatus, and a distributed processing method and in particular, relates to an information processing system, a processing apparatus, and a distributed processing method for performing a distributed processing among the processing apparatuses.

BACKGROUND ART

In recent years, the number of companies which analyze data related to a system or a service and use an analysis result in order to improve the system and the service is increasing. In such analysis system, for example, a server apparatus analyzes data which exists in the server apparatus, performs a rendering operation to generate image data such as a graph or the like, and transmits it to a client apparatus. The client apparatus displays the image data received from the server apparatus.

In such analysis system, when an amount of analysis object data is enormous, it takes much time and much load to perform the analytical process in the server apparatus. For this reason, there is a possibility that a problem in which the service cannot be started because a night batch process is not completed by the start of the office hours in the morning or a system failure impacts the business operation occurs. Further, in order to ensure the processing time, there is a restriction in which the latest data cannot be used as the analysis object data.

Thus, in the analysis system, in addition to improvement of analysis technology, a technology to reduce the load of the analytical process and a technology to avoid a large analysis load are required.

An example of a technology to reduce the load of the server apparatus in the above-mentioned system including the client apparatus and the server apparatus is disclosed in Japanese Patent Application Laid-Open No. 2000-267964.

In the technology disclosed in Japanese Patent Application Laid-Open No. 2000-267964, when a plurality of documents written in HTML (Hyper Text Markup Language) and received from the server apparatus are displayed in the client apparatus, linking the documents is not performed in the server apparatus but performed in the client apparatus according to the script written in HTML.

In the above-mentioned analysis system, by performing a part of the process of the server apparatus in the client apparatus like the invention disclosed in Japanese Patent Application Laid-Open No. 2000-26796, it is possible to reduce the load on the server apparatus. However, when the analysis object data includes confidential information, the data cannot be transmitted to the client apparatus. Therefore, there is a problem that a distributed processing performed by the server apparatus and the client apparatus cannot be achieved.

SUMMARY

An exemplary object of the present invention is to solve the above-mentioned problem and provide an information processing system, a processing apparatus, and a distributed processing method for performing a distributed processing even when processing object data includes confidential information.

An information processing system according to an exemplary aspect of the invention includes a first processing apparatus and a second processing apparatus, the second processing apparatus including: an apparatus determination unit which selects the first processing apparatus or the second processing apparatus as an apparatus to perform a predetermined process based on right information indicating a right of a user of the first processing apparatus to input data for the predetermined process; and a second processing unit which transmits the input data for the predetermined process to the first processing apparatus when the first processing apparatus performs the predetermined process, and performs the predetermined process by using the input data for the predetermined process and transmits a processing result of the predetermined process to the first processing apparatus when the second processing apparatus performs the predetermined process, and the first processing apparatus including: a first processing unit which performs the predetermined process by using the input data for the predetermined process that is received from the second processing apparatus when the first processing apparatus performs the predetermined process; and an output unit which outputs the processing result of the predetermined process.

A first processing apparatus of an information processing system including the processing apparatus and other processing apparatus, according to an exemplary aspect of the invention, includes: a processing unit which performs a predetermined process by using input data for the predetermined process that is received from the other processing apparatus when the processing apparatus performs the predetermined process; and an output unit which outputs a processing result of the predetermined process, wherein the other processing apparatus selects the processing apparatus or the other processing apparatus as an apparatus to perform the predetermined process based on right information indicating a right of a user of the processing apparatus to the input data for the predetermined process, transmits the input data for the predetermined process to the processing apparatus when the processing apparatus performs the predetermined process, and performs the predetermined process by using the input data for the predetermined process and transmits the processing result of the predetermined process to the processing apparatus when the other processing apparatus performs the predetermined process.

A second processing apparatus of an information processing system including other processing apparatus and the processing apparatus, according to an exemplary aspect of the invention, includes: an apparatus determination unit which selects the other processing apparatus or the processing apparatus as an apparatus to perform a predetermined process based on right information indicating a right of a user of the other processing apparatus to input data for the predetermined process; and a processing unit which transmits the input data for the predetermined process to the other processing apparatus when the other processing apparatus performs the predetermined process, and performs the predetermined process by using the input data for the predetermined process and transmits a processing result of the predetermined process to the other processing apparatus when the processing apparatus performs the predetermined process, wherein the other processing apparatus performs the predetermined process by using the input data for the predetermined process that is received from the processing apparatus when the other processing apparatus performs the predetermined process, and outputs the processing result of the predetermined process.

A distributed processing method for an information processing system including a first processing apparatus and a second processing apparatus, according to an exemplary aspect of the invention, includes: selecting the first processing apparatus or the second processing apparatus as an apparatus to perform a predetermined process based on right information indicating a right of a user of the first processing apparatus to input data for the predetermined process, in the second processing apparatus; transmitting the input data for the predetermined process to the first processing apparatus when the first processing apparatus performs the predetermined process, and performing the predetermined process by using the input data for the predetermined process and transmitting a processing result of the predetermined process to the first processing apparatus when the second processing apparatus performs the predetermined process, in the second processing apparatus, performing the predetermined process by using the input data for the predetermined process that is received from the second processing apparatus when the first processing apparatus performs the predetermined process, in the first processing apparatus; and outputting the processing result of the predetermined process, in the first processing apparatus.

A first non-transitory computer readable storage medium recording thereon a program, according to an exemplary aspect of the invention, causes a computer, for a processing apparatus of an information processing system including the processing apparatus and other processing apparatus, to function as: a processing unit which performs a predetermined process by using input data for the predetermined process that is received from the other processing apparatus when the processing apparatus performs the predetermined process; and an output unit which outputs a processing result of the predetermined process, wherein the other processing apparatus selects the processing apparatus or the other processing apparatus as an apparatus to perform the predetermined process based on right information indicating a right of a user of the processing apparatus to the input data for the predetermined process, transmits the input data for the predetermined process to the processing apparatus when the processing apparatus performs the predetermined process, and performs the predetermined process by using the input data for the predetermined process and transmits the processing result of the predetermined process to the processing apparatus when the other processing apparatus performs the predetermined process.

A second non-transitory computer readable storage medium recording thereon a program, according to an exemplary aspect of the invention, causes a computer, for a processing apparatus of an information processing system including other processing apparatus and the processing apparatus, to function as: an apparatus determination unit which selects the other processing apparatus or the processing apparatus as an apparatus to perform a predetermined process based on right information indicating a right of a user of the other processing apparatus to input data for the predetermined process; and a processing unit which transmits the input data for the predetermined process to the other processing apparatus when the other processing apparatus performs the predetermined process, and performs the predetermined process by using the input data for the predetermined process and transmits a processing result of the predetermined process to the other processing apparatus when the processing apparatus performs the predetermined process, wherein the other processing apparatus performs the predetermined process by using the input data for the predetermined process that is received from the processing apparatus when the other processing apparatus performs the predetermined process, and outputs the processing result of the predetermined process.

BRIEF DESCRIPTION OF THE DRAWINGS

Exemplary features and advantages of the present invention will become apparent from the following detailed description when taken with the accompanying drawings in which:

FIG. 10 is a flowchart showing a process performed by the server apparatus 200, according to the second exemplary embodiment of the present invention.

FIG. 11 is a diagram showing an extraction condition of a candidate for a take-over sub process, according to the second exemplary embodiment of the present invention.

FIG. 12 is a diagram showing an example of a calculation of an estimated processing time, according to the second exemplary embodiment of the present invention.

EXEMPLARY EMBODIMENT

First Exemplary Embodiment

A first exemplary embodiment of the present invention will be described.

First, a process (a predetermined process) performed by an analysis system, according to the first exemplary embodiment of the present invention, will be described.

Figure 6:
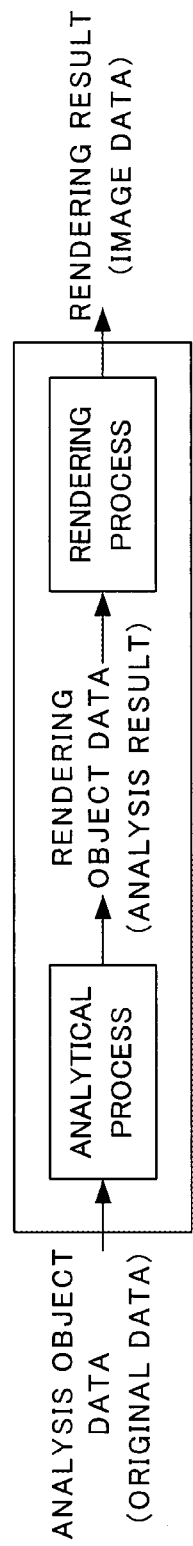
FIG. 6 is a diagram showing an example of a process performed by an analysis system, according to the first exemplary embodiment of the present invention.

FIG. 6 is a diagram showing an example of a process performed by the analysis system, according to the first exemplary embodiment of the present invention. In the process performed by the analysis system, the processing object data (original data) is analyzed and a rendering result based on the analysis result is outputted. The rendering result is image data for displaying the analysis result in a graph or the like. As shown in FIG. 6, the process performed by the analysis system includes an analytical process and a rendering process that are sub processes performed sequentially in order. In the analytical process, the analysis object data is inputted as input data and the analysis result is generated. In the rendering process, rendering object data that is the analysis result is inputted as input data and the rendering result is generated.

Figure 2:
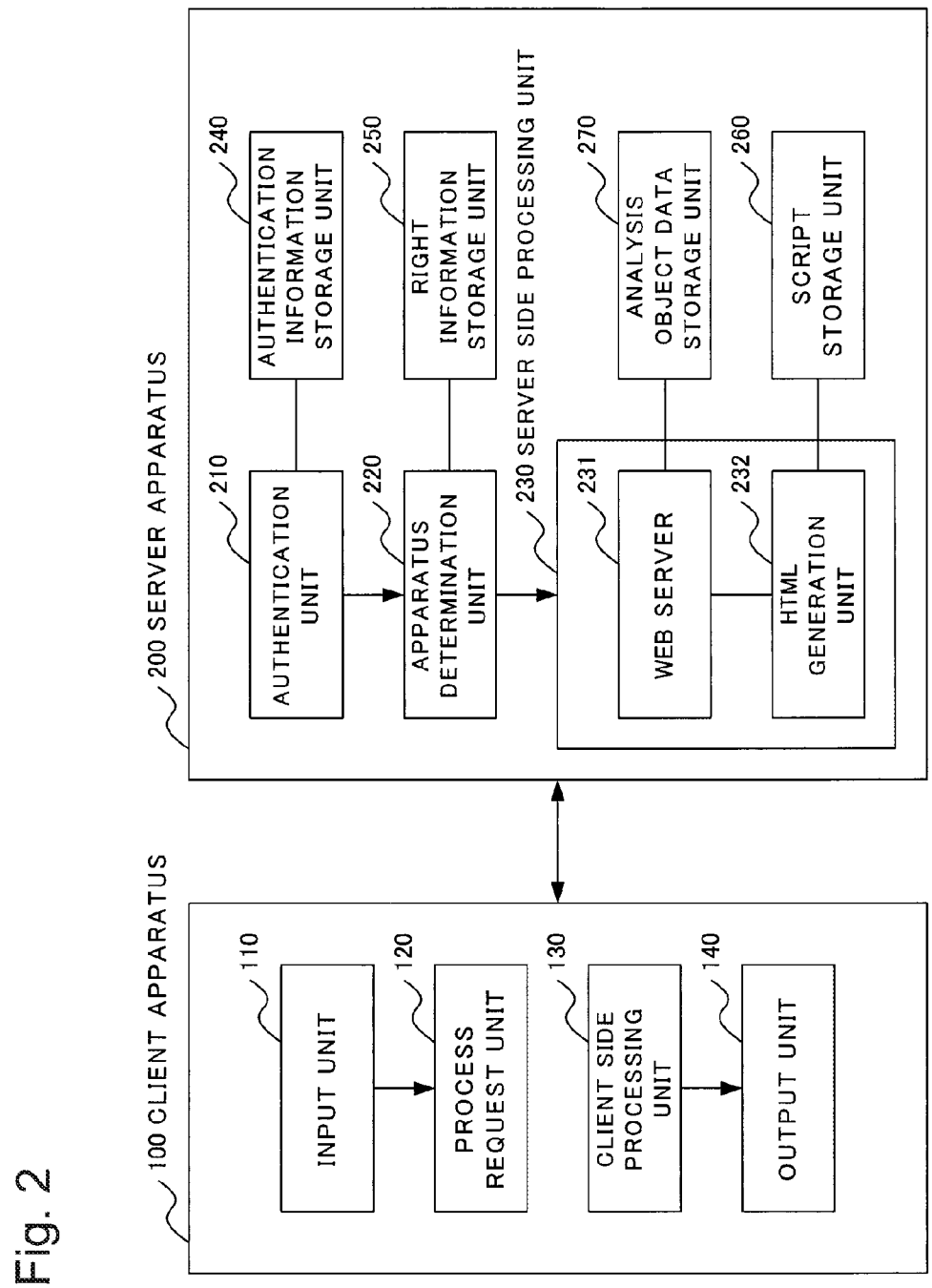
FIG. 2 is a block diagram showing a configuration of an analysis system according to the first exemplary embodiment of the present invention.

FIG. 2 is a block diagram showing a configuration of the analysis system, according to the first exemplary embodiment of the present invention. Referring to FIG. 2, a distributed processing system according to the first exemplary embodiment of the present invention includes a client apparatus 100 and a server apparatus 200.

The analysis system is one exemplary embodiment of the information processing system of the present invention. The client apparatus 100 is one exemplary embodiment of a first information processing apparatus (or a first processing apparatus) of the present invention and the server apparatus 200 is one exemplary embodiment of a second information processing apparatus (or a second processing apparatus) of the present invention.

The client apparatus 100 includes an input unit 110, a process request unit 120, a client side processing unit (or a first processing unit) 130, and an output unit 140.

The input unit 110 is an input apparatus such as a keyboard or the like, for example, and receives a request to display the analysis result of the processing object data from a user.

The process request unit 120 transmits a processing request to generate the rendering result (image data) based on the analysis result of the processing object data, to the server apparatus 200.

The client side processing unit 130 performs one or more sub processes from a take-over sub process among a series of sub processes (the analytical process and the rendering process).

The output unit 140 is a display apparatus such as a display or the like, for example, and outputs (displays) the rendering result generated by the client side processing unit 130 or the rendering result received from the server apparatus 200. The output unit 140 may output the rendering result by using another form such as a data file or the like.

The server apparatus 200 includes an authentication unit 210, an apparatus determination unit 220, a server side processing unit (or a second processing unit) 230, an authentication information storage unit 240, a right information storage unit 250, a script storage unit (processing program storage unit) 260, and an analysis object data storage unit 270.

The authentication information storage unit 240 stores authentication information to authenticate a user. The authentication information is information such as a user identifier, a password, an identifier of the client apparatus 100, a certificate for the user, or the like, for example, and is used to determine whether or not the user is a qualified user. The authentication information may include information indicating a level or a roll of the user in association with the user identifier.

The authentication unit 210 performs user authentication based on the authentication information.

The right information storage unit 250 stores right information 251. The right information 251 indicates an access right (hereinafter, simply described as a right) of each user with respect to each sub process of the series of sub processes. Note that the right may be a read right, a browsing right, or a use right of the user with respect to each sub process.

Figures 7, 8:
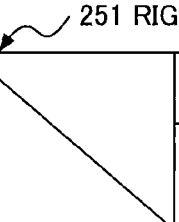
FIG. 7 is a diagram showing an example of right information 251, according to the first exemplary embodiment of the present invention.
FIG. 8 is a diagram showing a decision condition of a take-over sub process, according to the first exemplary embodiment of the present invention.

FIG. 7 is a diagram showing an example of the right information 251, according to the first exemplary embodiment of the present invention. In the right information 251, the right (y: has a right, n: has no right) of a user with respect to each sub process of the series of the sub processes (the analytical process and the rendering process) is set, in association with an identifier of each user.

In the right information 251, the right with respect to each sub process of the series of the sub processes may be set in association with each level or each roll.

The apparatus determination unit 220 selects a take-over sub process from among the series of the sub processes based on the right information 251. Here, the take-over sub process is a sub process performed firstly among the one or more sub processes to be performed by the client apparatus 100 (the top of the one or more sub processes to be performed by the client apparatus 100).

FIG. 8 is a diagram showing a decision condition of the take-over sub process, according to the first exemplary embodiment of the present invention.

As shown in FIG. 8, when a user has a right to both of the analysis object data and the rendering object data, the apparatus determination unit 220 selects the "analytical process" as the take-over sub process. When a user does not have a right to the analysis object data but has a right to the rendering object data, the apparatus determination unit 220 selects the "rendering process" as the take-over sub process. In a case other than the above-mentioned cases, the apparatus determination unit 220 selects "not applicable" as the take-over sub process. In this case, the server apparatus 200 performs the series of the sub processes.

The script storage unit 260 stores a script such as Java Script (registered trademark) or the like, for example. The script is a processing program for performing the analytical process or the rendering process. The type of processing program may be a type other than Java Script, as long as the client side processing unit 130 and the server side processing unit 230 can execute the type of processing program. The client side processing unit 130 and the server side processing unit 230 may use different types of processing programs, each other, for the same sub process.

The analysis object data storage unit 270 stores the analysis object data.

The server side processing unit 230 includes a WEB server 231 and an HTML generation unit 232.

The WEB server 231 performs one or more sub processes before the take-over sub process in the series of the sub processes and transmits a processing response to the client apparatus 100.

The HTML generation unit 232 generates HTML data of the processing response. The HTML generation unit 232 generates the HTML data including the input data of the take-over sub process and the script for each of one or more sub processes from the take-over sub process, or a processing result of the last sub process.

The HTML generation unit 232 may generate each piece of HTML data by using an HTML template or a script template. The HTML generation unit 232 may include the input data in the script.

The processing response may be transmitted with a form other than the HTML, as long as the input data of the take-over sub process and the script for each of one or more sub processes from the take-over sub process, or the processing result of the last sub process can be transmitted to the client apparatus 100.

Note that each of the client apparatus 100 and the server apparatus 200 may include a CPU (Central Processing Unit) and a storage medium storing a program and may be a computer which operates under program control. The authentication information storage unit 240, the right information storage unit 250, the script storage unit 260, and the analysis object data storage unit 270 in the server apparatus 200 may be composed of the individual storage media (such as a memory, a hard disk, or the like) or these units may be configured as one storage medium.

Figure 3:
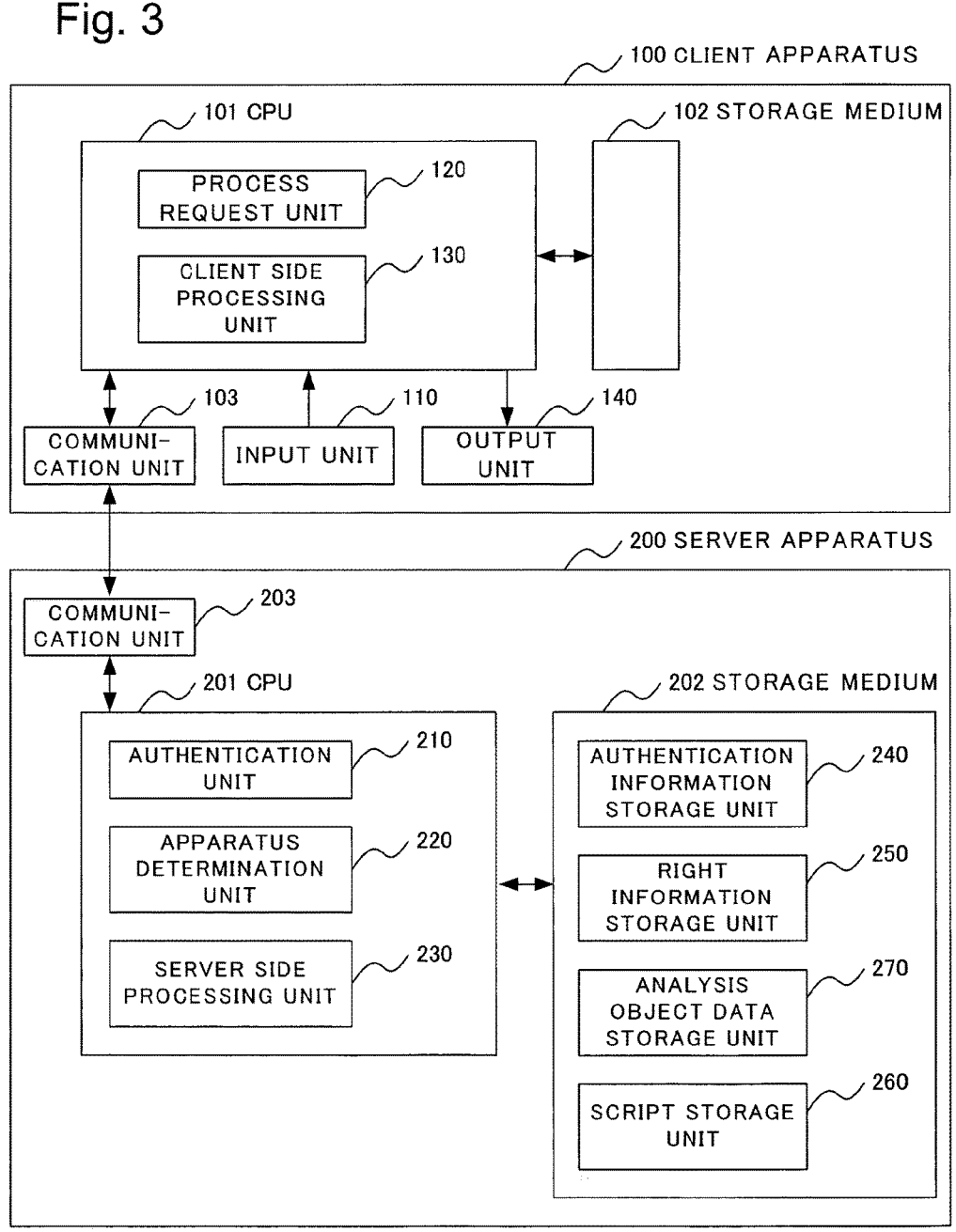
FIG. 3 is a block diagram showing a configuration of the analysis system according to the first exemplary embodiment of the present invention, in which a client apparatus 100 and a server apparatus 200 are realized by a computer.

FIG. 3 is a block diagram showing a configuration of the analysis system, according to the first exemplary embodiment of the present invention, in which the client apparatus 100 and the server apparatus 200 are realized by a computer.

In this case, the client apparatus 100 includes a CPU 101, a storage medium 102, a communication unit 103, the input unit 110, and the output unit 140. The CPU 101 executes the computer program to realize the functions of the process request unit 120 and the client side processing unit 130. The communication unit 103 transmits the processing request to the server apparatus 200 and receives the processing response from the server apparatus 200.

The server apparatus 200 includes a CPU 201, a storage medium 202, and a communication unit 203. The CPU 201 executes the computer program to realize the functions of the authentication unit 210, the apparatus determination unit 220, and the server side processing unit 230. The storage medium 202 stores data of the authentication information storage unit 240, the right information storage unit 250, the script storage unit 260, and the analysis object data storage unit 270. The communication unit 203 receives the processing request from the client apparatus 100 and transmits the processing response to the client apparatus 100.

Next, operation of the first exemplary embodiment of the present invention will be described.

Figure 4:
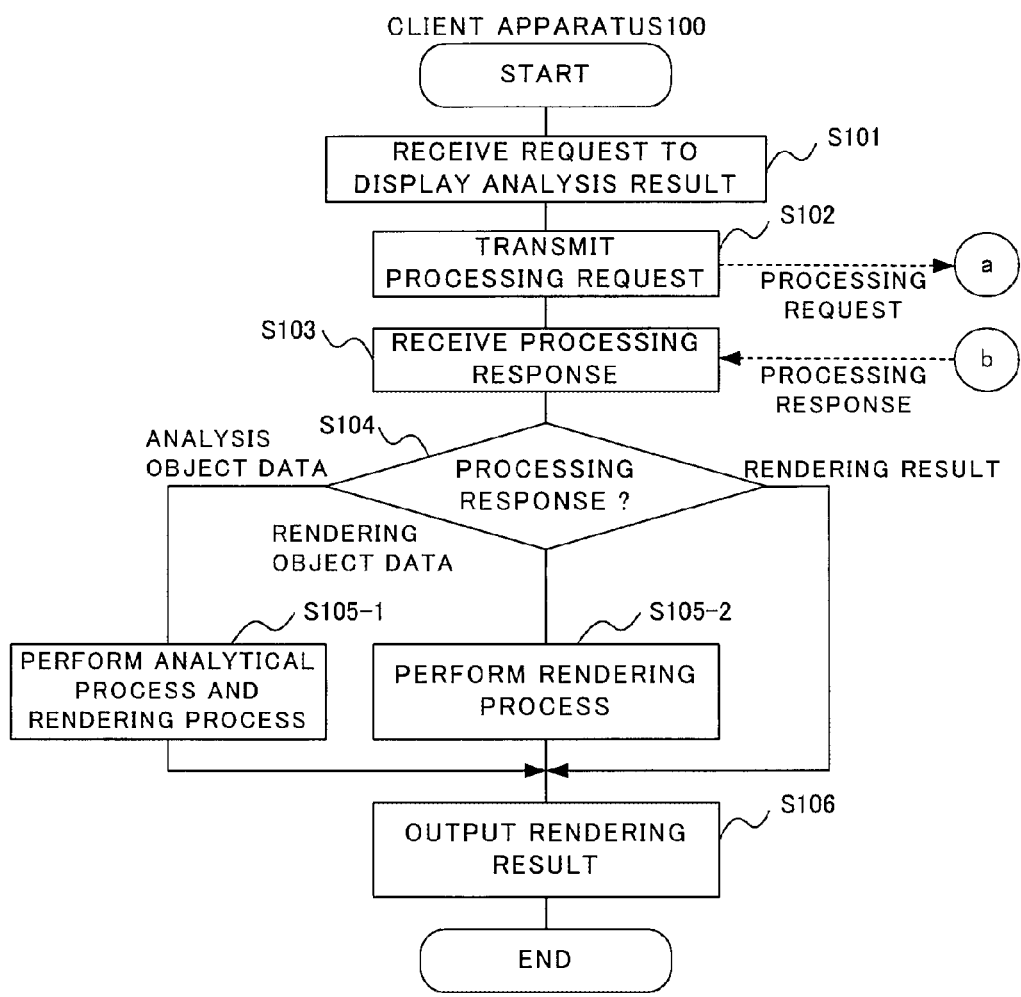
FIG. 4 is a flowchart showing a process performed by the client apparatus 100, according to the first exemplary embodiment of the present invention.
Figure 5:
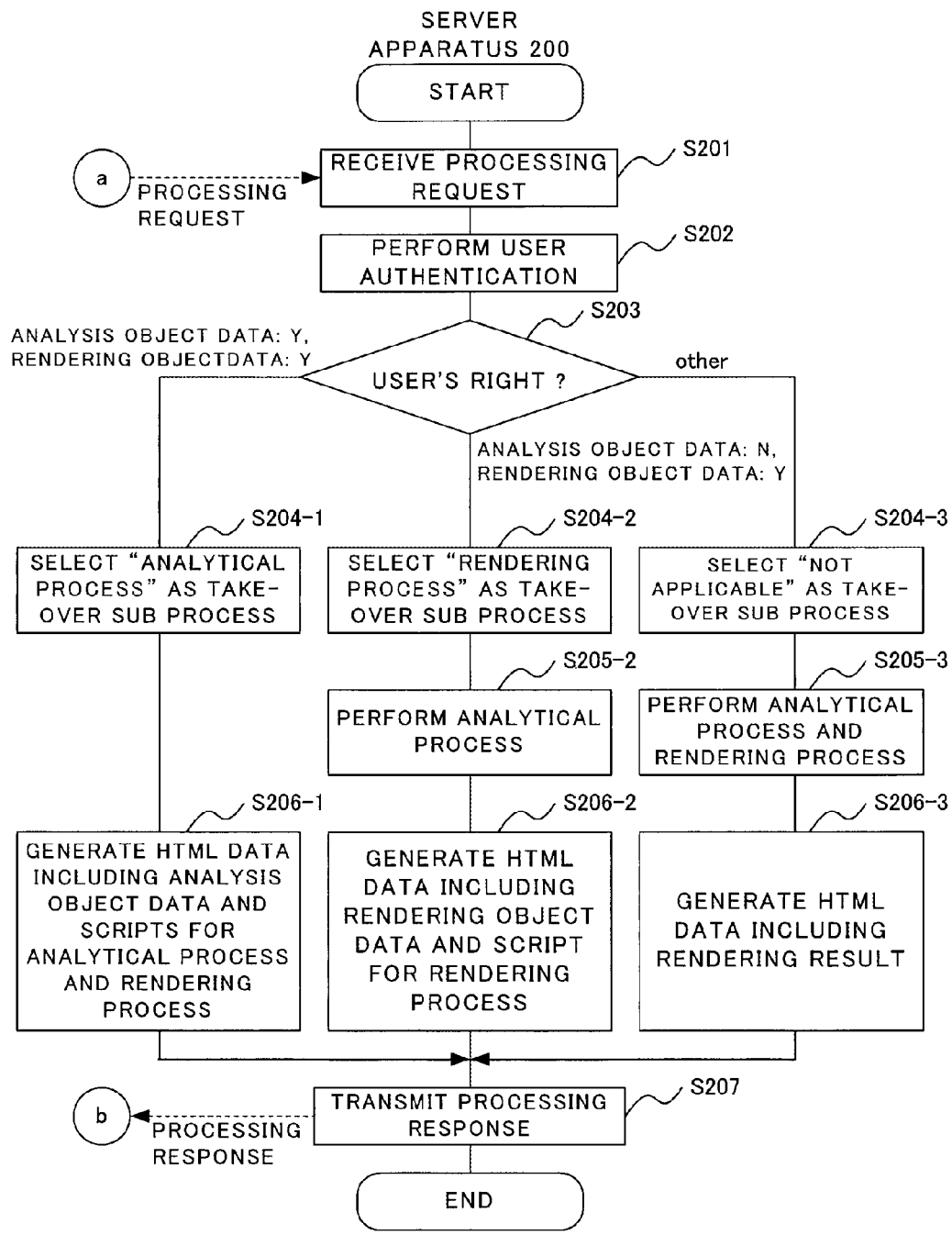
FIG. 5 is a flowchart showing a process performed by the server apparatus 200, according to the first exemplary embodiment of the present invention.

FIG. 4 and the FIG. 5 are flowcharts showing processes performed by the client apparatus 100 and the server apparatus 200, respectively, according to the first exemplary embodiment of the present invention.

Here, it is assumed that the right information storage unit 250 stores the right information 251 shown in FIG. 7.

First, the input unit 110 of the client apparatus 100 receives a request to display an analysis result of processing object data from a user (Step S101). The process request unit 120 transmits a processing request to the server apparatus 200 (Step S102). The processing request includes information required for user authentication. The processing request may include information indicating a range of analysis object data.

For example, the input unit 110 receives an analysis request from a user having a user identifier "user B". Then, the process request unit 120 transmits a processing request including the user identifier "user B".

When the authentication unit 210 of the server apparatus 200 receives the processing request from the client apparatus 100 (Step S201), the authentication unit 210 performs user authentication based on the information included in the processing request and the authentication information (Step S202).

When the user is a qualified user, the apparatus determination unit 220 obtains information about a right of the user to input data of each sub process (analytical process and rendering process) from the right information 251. The apparatus determination unit 220 selects a take-over sub process, using the obtained information about a right, according to FIG. 8 (Step S203).

When the user has a right to the analysis object data and the analysis result (Step S203/analysis object data: y and rendering object data: y), the apparatus determination unit 220 selects the "analytical process" as the take-over sub process (step S204-1). The HTML generation unit 232 generates HTML data including the analysis object data obtained from the analysis object data storage unit 270 and scripts for the analytical process and the rendering process that are obtained from the script storage unit 260 (step S206-1).

When the user does not have a right to the analysis object data but has a right to the analysis result (Step S203/analysis object data: n and rendering object data: y), the apparatus determination unit 220 selects the "rendering process" as the take-over sub process (step S204-2). The WEB server 231 uses the analysis object data obtained from the analysis object data storage unit 270 as the input data, performs the analytical process by using the script for the analytical process obtained from the script storage unit 260, and generates a rendering object data (an analysis result) (step S205-2). The HTML generation unit 232 generates HTML data including the rendering object data generated by the WEB server 231 and the script for the rendering process that is obtained from the script storage unit 260 (step S206-2).

In a case other than the above-mentioned cases (step S203/other), the apparatus determination unit 220 selects "not applicable" as the take-over sub process (step S204-3). The WEB server 231 uses the analysis object data obtained from the script storage unit 260 as the input data, performs the analytical process and the rendering process by using the scripts for the analytical process and the rendering process that are obtained from the script storage unit 260, and generates a rendering result (graph) (step S205-3). The HTML generation unit 232 generates HTML data including the rendering result generated by the WEB server 231 (step S206-3).

The WEB server 231 transmits the processing response including the generated HTML data to the client apparatus 100 (Step S207).

For example, the apparatus determination unit 220 obtains information about rights "analysis object data: n, rendering object data: y" of the user having the user identifier "user B" from the right information 251 shown in FIG. 7, and selects the "rendering process" as the take-over sub process. The WEB server 231 performs the analytical process and transmits the processing response including rendering object data and a script for the rendering process.

When the client side processing unit 130 of the client apparatus 100 receives the processing response from the server apparatus 200 (Step S103), the client side processing unit 130 determines a sub process performed by the client apparatus 100 based on the content of the processing response (Step S104).

When the processing response includes the analysis object data and the scripts for the analytical process and the rendering process (Step S104/analysis object data), the client side processing unit 130 uses the analysis object data obtained from the processing response as the input data, performs the analytical process and the rendering process by using the scripts for the analytical process and the rendering process that are obtained from the processing response, and to generates a rendering result (graph) (step S105-1).

When the processing response includes the rendering object data and the script for the rendering process (Step S104/rendering object data), the client side processing unit 130 uses the rendering object data obtained from the processing response as the input data, performs the rendering process by using the script for the rendering process obtained from the processing response, and generates a rendering result (graph) (step S105-2).

For example, the client side processing unit 130 performs the rendering process by using the rendering object data obtained from the processing response and the script for the rendering process obtained from the processing response.

The output unit 140 outputs (displays) the rendering result generated by the client side processing unit 130 or the rendering result included in the processing response received from the server apparatus 200 to the user (Step S106).

For example, the output unit 140 displays the rendering result generated by the client side processing unit 130.

With that step, the operation of the first exemplary embodiment of the present invention is completed.

Note that, in the first exemplary embodiment of the present invention, a case in which the process performed by the analysis system includes two sub processes (the analytical process and the rendering process) has been explained as an example.

However, the process performed by the analysis system is not limited to the above-mentioned process. The process may include another sub process other than the analytical process and the rendering process.

The process performed by the analysis system may be composed of one sub process. In this case, when the user has a right to input data for the process performed by the analysis system, the client apparatus 100 performs the process and otherwise the server apparatus 200 performs the process.

The process performed by the analysis system may be a series of more than two sub processes to be performed in a predetermined order.

In this case, the right information 251 indicates a right of a user to input data of each sub process of the series of the sub processes. When the user has a right to the input data for all of sub processes of the series of the sub processes, the apparatus determination unit 220 selects the first sub process among the series of the sub processes as the take-over sub process. When the user has a right to the input data for all of sub processes from the specific sub process that is a process at the second or later in the series of the sub processes, the apparatus determination unit 220 selects the specific sub process as the take-over sub process. In a case other than the above-mentioned cases, the apparatus determination unit 220 selects "not applicable" as the take-over sub process.

In the first exemplary embodiment of the present invention, although the server apparatus 200 obtains a script for each sub process to be performed by the client apparatus 100 from the script storage unit 260 and transmits it to the client apparatus 100, the client apparatus 100 may obtain the script for each sub process to be performed by the client apparatus 100 from a script storage unit (not shown) of the client apparatus 100.

The form of the input data of each sub process that is transmitted from the server apparatus 200 to the client apparatus 100 may be a form that can be used only by an allowed script. In this case, the input data may be encrypted in such a way that the input data is decrypted and used only by the allowed script.

Figure 1:
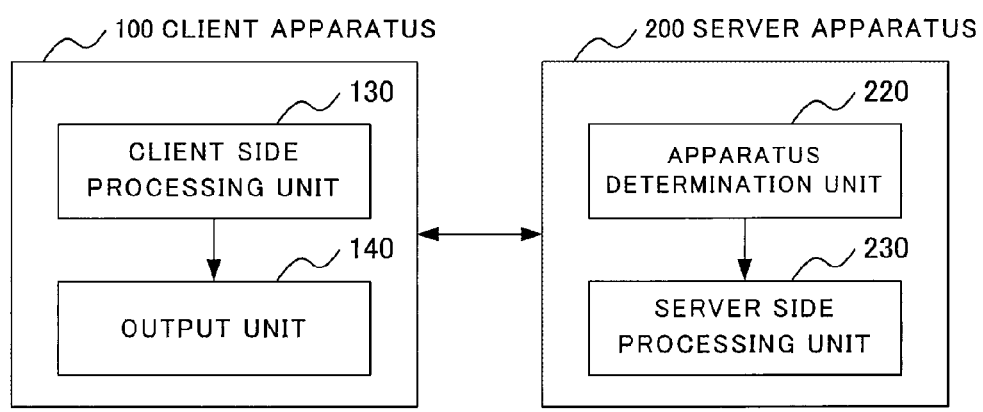
FIG. 1 is a block diagram showing a characteristic configuration of a first exemplary embodiment of the present invention.

Next, a characteristic configuration of the first exemplary embodiment of the present invention will be described. FIG. 1 is a block diagram showing a characteristic configuration of the first exemplary embodiment of the present invention.

An information processing system includes a client apparatus (a first processing apparatus) 100 and a server apparatus (a second processing apparatus) 200.

The server apparatus 200 includes an apparatus determination unit 220 and a server side processing unit (a second processing unit) 230. The apparatus determination unit 220 selects the client apparatus 100 or the server apparatus 200 as an apparatus which performs a predetermined process based on right information 251 indicating a right of a user of the client apparatus 100 to input data for the predetermined process. When the client apparatus 100 performs the predetermined process, the server side processing unit 230 transmits the input data for the predetermined process to the client apparatus 100. When the server apparatus 200 performs the predetermined process, the server side processing unit 230 performs the predetermined process by using the input data for the predetermined process and transmits a processing result of the predetermined process to the client apparatus 100.

The client apparatus 100 includes a client side processing unit (a first processing unit) 130 and an output unit 140. When the client apparatus 100 performs the predetermined process, the client side processing unit 130 performs the predetermined process by using the input data for the predetermined process that is received from the server apparatus 200. The output unit 140 outputs the processing result of the predetermined process.

Next, the effect of the first exemplary embodiment of the present invention will be described.

According to the first exemplary embodiment of the present invention, even when processing object data includes confidential information, distributed processing can be performed. This is because the apparatus determination unit 220 selects the client apparatus 100 or the server apparatus 200 as an apparatus which performs the predetermined process based on the right information 251 indicating a right of a user of the client apparatus 100 to input data for a predetermined process. As a result, even when the processing object data includes the confidential information, concentrated load on the server apparatus can be distributed to the client apparatus while maintaining security for the confidential information.

In addition, according to the first exemplary embodiment of the present invention, even when the user does not have a right to the processing object data, the distributed processing can be performed. This is because the apparatus determination unit 220 selects a take-over sub process that is the top of one or more sub processes to be performed by the client apparatus from among a series of the sub processes based on the right information 251 indicating a right of the user of the client apparatus 100 to input data for each sub process of the series of the sub processes. For example, when the analytical process is performed to the original processing object data including a plurality pieces of personal information and company information and the rendering process is performed to the analysis result, the analysis result and the rendering result are abstract data indicating the feature of the original processing object data and have higher anonymity than that of the original processing object data. In this case, even if the user does not have a right to the original processing object data (input data for the first sub process), there is a possibility that the user has a right to the input data for the subsequent sub process. Accordingly, the subsequent sub process such as the rendering process can be performed by the client apparatus.

Second Exemplary Embodiment

Next, a second exemplary embodiment of the present invention will be described.

In the second exemplary embodiment of the present invention, the take-over sub process is determined by using an estimated processing time in addition to the right information 251. This is a difference between the first exemplary embodiment and the second exemplary embodiment.

First, a configuration of the second exemplary embodiment of the present invention will be described.

Figure 9:
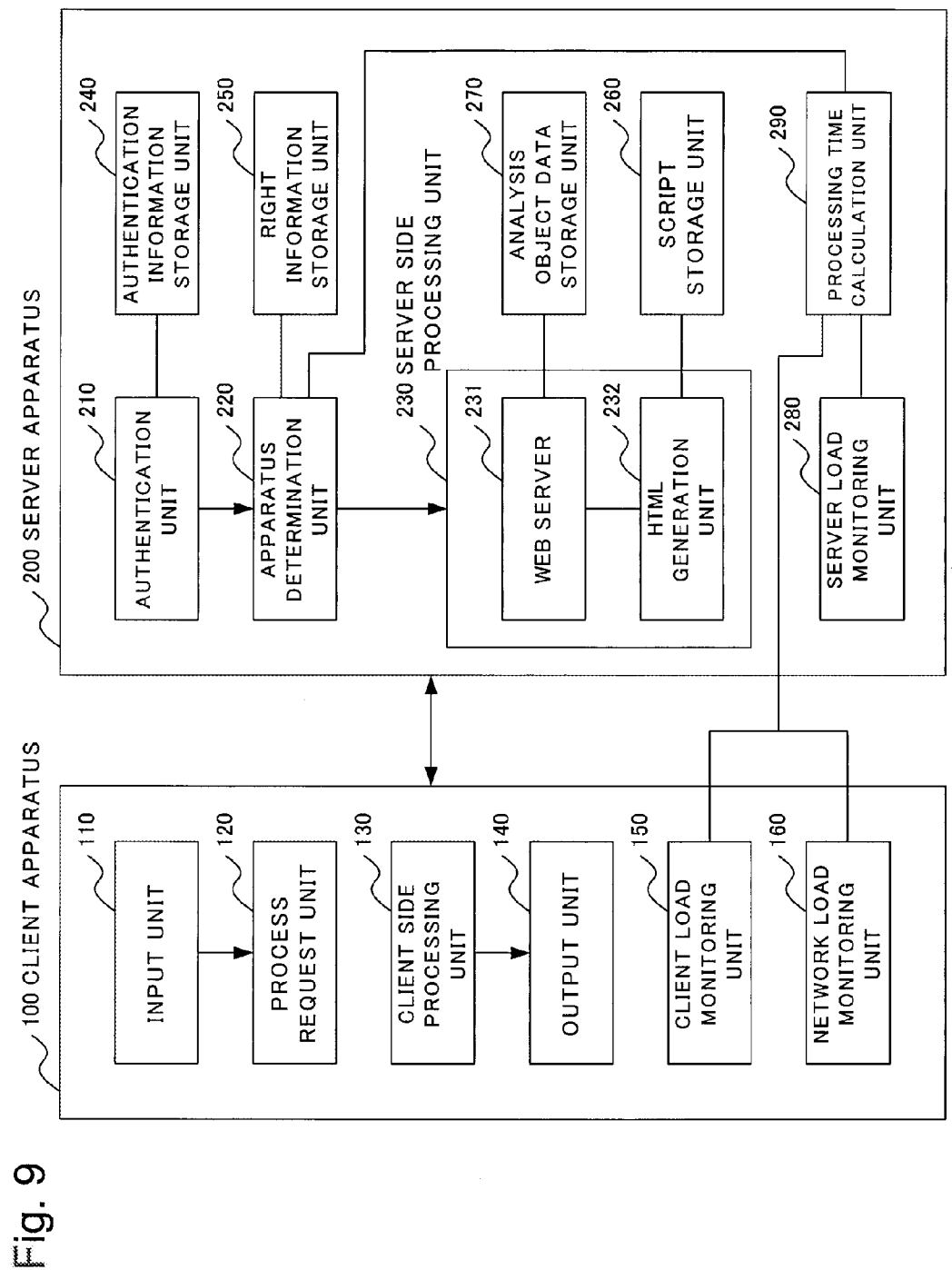
FIG. 9 is a block diagram showing a configuration of the analysis system according to a second exemplary embodiment of the present invention.

FIG. 9 is a block diagram showing a configuration of the analysis system according to the second exemplary embodiment of the present invention.

Referring to FIG. 9, the client apparatus 100 according to the second exemplary embodiment of the present invention includes a client load monitoring unit 150 and a network load monitoring unit 160 in addition to the components of the client apparatus 100 of the first exemplary embodiment of the present invention.

The client load monitoring unit 150 collects load information such as CPU utilization or the like in the client apparatus 100. The network load monitoring unit 160 collects network load information such as a throughput or the like in communication between the client apparatus 100 and the server apparatus 200.

The server apparatus 200 according to the second exemplary embodiment of the present invention includes a server load monitoring unit 280 and a processing time calculation unit 290 in addition to the components of the server apparatus 200 of the first exemplary embodiment of the present invention. The server load monitoring unit 280 collects load information such as CPU utilization or the like in the server apparatus 200. The processing time calculation unit 290 calculates an estimated processing time to perform the series of the sub processes for each candidate for the take-over sub process based on the load information obtained from the client load monitoring unit 150 and the server load monitoring unit 280, and the network load information obtained from the network load monitoring unit 160.

Here, the processing time calculation unit 290 obtains a processing time of each sub process (the analytical process or the rendering process) of the series of the sub processes in the client apparatus 100 and the server apparatus 200, and a transfer time of each piece of transfer data (the analysis object data, the rendering object data, or the rendering result) based on the load information and the network load information. The processing time calculation unit 290 obtains the processing time of each sub process in the client apparatus 100 and the server apparatus 200, and the transfer time of each piece of transfer data by using a predetermined calculation formula or a predetermined conversion table for the load information and the network load information. The processing time calculation unit 290 may obtain the processing time of each sub process in the client apparatus 100 and the server apparatus 200, and the transfer time of each piece of transfer data by using a predetermined calculation formula or a predetermined conversion table for the size of input data of each sub process or the size of each piece of transfer data, instead of the load information and the network load information. Further, the client load monitoring unit 150, the server load monitoring unit 280, and the network load monitoring unit 160 may monitor the processing time of each sub process in the client apparatus 100 and the server apparatus 200, and the transfer time of each piece of transfer data, and the processing time calculation unit 290 may obtain the processing time and the transfer time. The processing time calculation unit 290 calculates the estimated processing time by summing the processing time and the transfer time for each candidate for the take-over sub process.

The apparatus determination unit 220 extracts the candidate for the take-over sub process from among the series of the sub processes based on the right information 251.

FIG. 11 is a diagram showing an extraction condition of the candidate for the take-over sub process, according to the second exemplary embodiment of the present invention.

As shown in FIG. 11, when a user has a right to both of the analysis object data and the rendering object data, the apparatus determination unit 220 extracts the "analytical process", the "rendering process" and "not applicable" as the candidate for the take-over sub process. When a user does not have a right to the analysis object but has a right to the rendering object data, the apparatus determination unit 220 extracts the "rendering process" and "not applicable" as the candidate for the take-over sub process. In a case other than the above-mentioned cases, the apparatus determination unit 220 extracts "not applicable" as the candidate for the take-over sub process.

The apparatus determination unit 220 obtains the estimated processing time for each candidate for the take-over sub process from the processing time calculation unit 290 and selects the candidate with the shortest estimated processing time as the take-over sub process.

Next, operation of the second exemplary embodiment of the present invention will be described.

FIG. 10 is a flowchart showing a process performed by the server apparatus 200, according to the second exemplary embodiment of the present invention.

Here, it is assumed that the right information storage unit 250 stores the right information 251 shown in FIG. 7.

The operations from receiving the analysis request from the user in the client apparatus 100 until performing the user authentication in the server apparatus 200 (Steps S101, S102, S301, S302) are the same as the operations of the first exemplary embodiment of the present invention (Steps S101, S102 shown in FIG. 4 and Steps S201, S202 shown in FIG. 5).

When the user is a qualified user, the apparatus determination unit 220 obtains information about a right of the user to input data of each sub process (the analytical process and the rendering process) from the right information 251. The apparatus determination unit 220 extracts candidates for the take-over sub process, using the obtained information about a right, according to FIG. 11 (Step S303).

For example, the apparatus determination unit 220 obtains information to about rights "analysis object data: y, rendering object data: y" of the user having the user identifier "user A" from the right information 251 shown in FIG. 7 and extracts the "analytical process", the "rendering process", and "not applicable" as candidates for the take-over sub process.

The apparatus determination unit 220 obtains an estimated processing time for each candidate from the processing time calculation unit 290 and selects the candidate with the shortest estimated processing time as the take-over sub process (steps S304-1 and S304-2).

FIG. 12 is a diagram showing an example of a calculation of the estimated processing time according to the second exemplary embodiment of the present invention.

For example, with respect to the candidate "analytical process" for the take-over sub process, the processing time calculation unit 290 calculates the estimated processing time by summing the processing time of the analytical process and the processing time of the rendering process in the client apparatus 100 and the transfer time of the analysis object data. Further, with respect to the candidate "rendering process" for the take-over sub process, the processing time calculation unit 290 calculates the estimated processing time by summing the processing time of the analytical process in the server apparatus 200, the processing time of the rendering process in the client apparatus 100, and the transfer time of the rendering object data. With respect to the candidate "not applicable" for the take-over sub process, the processing time calculation unit 290 calculates the estimated processing time by summing the processing time of the analytical process in the server apparatus 200, the processing time of the rendering process in the server apparatus 200, and the transfer time of the rendering result. In FIG. 12, the apparatus determination unit 220 selects the candidate "rendering process" for the take-over sub process with the shortest estimated processing time as the take-over sub process.

After this selection, according to the selected take-over sub process, the WEB server 231 performs one or more sub processes before the take-over sub process and the client side processing unit 130 performs one or more sub processes from the take-over sub process. The operations until outputting the rendering result by the output unit 140 (Steps S305 to S307, and Steps S103 to S106) are the same as the operations of the first exemplary embodiment of the present invention (Steps S205 to S207 shown in FIG. 5, and Steps S103 to S106 shown in FIG. 4).

Next, the effect of the second exemplary embodiment of the present invention will be described.

According to the second exemplary embodiment of the present invention, the distributed processing can be performed at a high speed compared with the first exemplary embodiment of the present invention. This is because the apparatus determination unit 220 selects the take-over sub process by using an estimated processing time in addition to the right information 251.

An exemplary advantage according to the present invention is that the distributed processing can be performed even when processing object data includes confidential information.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An information processing system comprising a first processing apparatus and a second processing apparatus,
the second processing apparatus
including:
a memory storing instructions; and
one or more processors configured to execute the instructions to:
select, in response to a request for a predetermined process from the first processing apparatus, the first processing apparatus or the second processing apparatus as an apparatus to perform the predetermined process based on right information indicating a right of a user of the first processing apparatus to input data for the predetermined process, and
transmit the input data for the predetermined process to the first processing apparatus when the first processing apparatus is selected as an apparatus to perform the predetermined process, and perform the predetermined process by using the input data for the predetermined process and transmits a processing result of the predetermined process to the first processing apparatus when the second processing apparatus is selected as an apparatus to perform the predetermined process, and
the first processing apparatus including:
a memory storing instructions; and
one or more processors configured to execute the instructions to:
perform the predetermined process by using the input data for the predetermined process that is received from the second processing apparatus when the first processing apparatus is selected as an apparatus to perform the predetermined process, and
output the processing result of the predetermined process, wherein
the predetermined process includes a plurality of sub processes performed in a predetermined order, the sub processes each using a processing result of another sub process performed before the sub process as input data,
the right information indicates a right of the user of the first processing apparatus to input data for each sub process of the plurality of sub processes,
the one or more processors of the second processing apparatus configured to execute the instructions to select a take-over sub process that is a top of one or more sub processes to be performed by the first processing apparatus, from among a plurality of the sub processes, based on the right information, perform one or more sub processes before the take-over sub process in the predetermined order and transmit input data for the take-over sub process to the first processing apparatus, and
the one or more processors of the first processing apparatus configured to execute the instructions to perform one or more sub processes from the take-over sub process in the predetermined order using the input data for the take-over sub process that is received from the second processing apparatus.

2. The information processing system according to claim 1, wherein,
when the user has the right to input data for all of one or more sub processes from one sub process among a plurality of the sub processes, the one or more processors of the second processing apparatus configured to execute the instructions to selects the one sub process as the take-over sub process.

3. The information processing system according to claim 1, wherein,
when the user has the right to input data for all of one or more sub processes from one sub process among a plurality of the sub processes, the one or more processors of the second processing apparatus configured to execute the instructions to select one or more sub processes from the one sub process as candidates for the take-over sub process and select the take-over sub process from among the candidates for the take-over sub process, based on an estimated processing time to perform the plurality of sub processes when each of the candidates for the take-over sub process is selected as the take-over sub process.

4. The information processing system according to claim 3, wherein
the estimated processing time to perform the plurality of the sub processes is determined based on at least one of a processing time to perform the one or more sub processes before the take-over sub process in the second processing apparatus, a processing time to perform the one or more sub processes from the take-over sub process in the first processing apparatus, and a transfer time of the input data for the take-over sub process from the second processing apparatus to the first processing apparatus.

5. The information processing system according to claim 1, wherein
the one or more processors of the second processing apparatus configured to execute the instructions to stores, for each of the plurality of the sub processes, a processing program to perform the sub process, and transmits the processing program for each of the one or more sub process to be performed by the first processing apparatus, to the first processing apparatus together with the input data for the take-over sub process, and
the one or more processors of the first processing apparatus configured to execute the instructions to perform the one or more sub process to be performed by the first processing apparatus, using the processing program received from the second processing apparatus.

6. A processing apparatus of an information processing system including the processing apparatus and other processing apparatus, comprising:
a memory storing instructions; and
one or more processors configured to execute the instructions to:
perform a predetermined process by using input data for the predetermined process that is received from the other processing apparatus when the processing apparatus is selected as an apparatus to perform the predetermined process, and
output a processing result of the predetermined process, wherein
the other processing apparatus selects, in response to a request for the predetermined process from the processing apparatus, the processing apparatus or the other processing apparatus as an apparatus to perform the predetermined process based on right information indicating a right of a user of the processing apparatus to the input data for the predetermined process, transmits the input data for the predetermined process to the processing apparatus when the processing apparatus is selected as an apparatus to perform the predetermined process, and performs the predetermined process by using the input data for the predetermined process and transmits the processing result of the predetermined process to the processing apparatus when the other processing apparatus is selected as an apparatus to perform the predetermined process, wherein
the predetermined process includes a plurality of sub processes performed in a predetermined order, the sub processes each using a processing result of another sub process performed before the sub process as input data,
right information indicates a right of the user of the processing apparatus to input data for each sub process of the plurality of sub processes,
one or more processors of the other processing apparatus configured to execute instructions to select a take-over sub process that is a top of one or more sub processes to be performed by the processing apparatus, from among a plurality of the sub processes, based on the right information, perform one or more sub processes before the take-over sub process in the predetermined order and transmit input data for the take-over sub process to the processing apparatus, and the one or more processors of the processing apparatus configured to execute the instructions to perform one or more sub processes from the take-over sub process in the predetermined order using the input data for the take-over sub process that is received from the other processing apparatus.

7. A processing apparatus of an information processing system including other processing apparatus and the processing apparatus, comprising:
a memory storing instructions; and
one or more processors configured to execute the instructions to:
select, in response to a request for a predetermined process from the other processing apparatus, the other processing apparatus or the processing apparatus as an apparatus to perform the predetermined process based on right information indicating a right of a user of the other processing apparatus to input data for the predetermined process, and
transmit the input data for the predetermined process to the other processing apparatus when the other processing apparatus is selected as an apparatus to perform the predetermined process, and perform the predetermined process by using the input data for the predetermined process and transmits a processing result of the predetermined process to the other processing apparatus when the processing apparatus is selected as an apparatus to perform the predetermined process, wherein
the other processing apparatus performs the predetermined process by using the input data for the predetermined process that is received from the processing apparatus when the other processing apparatus is selected as an apparatus to perform the predetermined process, and outputs the processing result of the predetermined process, wherein
the predetermined process includes a plurality of sub processes performed in a predetermined order, the sub processes each using a processing result of another sub process performed before the sub process as input data,
right information indicates a right of the user of the processing apparatus to input data for each sub process of the plurality of sub processes,
one or more processors of the other processing apparatus configured to execute instructions to select a take-over sub process that is a top of one or more sub processes to be performed by the processing apparatus, from among a plurality of the sub processes, based on the right information, perform one or more sub processes before the take-over sub process in the predetermined order and transmit input data for the take-over sub process to the processing apparatus, and
the one or more processors of the processing apparatus configured to execute the instructions to perform one or more sub processes from the take-over sub process in the predetermined order using the input data for the take-over sub process that is received from the other processing apparatus.

8. A distributed processing method for an information processing system including a first processing apparatus and a second processing apparatus comprising:
selecting, in response to a request for a predetermined process from the first processing apparatus, the first processing apparatus or the second processing apparatus as an apparatus to perform a predetermined process based on right information indicating a right of a user of the first processing apparatus to input data for the predetermined process, in the second processing apparatus;

transmitting the input data for the predetermined process to the first processing apparatus when the first processing apparatus is selected as an apparatus to perform the predetermined process, and performing the predetermined process by using the input data for the predetermined process and transmitting a processing result of the predetermined process to the first processing apparatus when the second processing apparatus is selected as an apparatus to perform the predetermined process, in the second processing apparatus, performing the predetermined process by using the input data for the predetermined process that is received from the second processing apparatus when the first processing apparatus is selected as an apparatus to performs the predetermined process, in the first processing apparatus; and outputting the processing result of the predetermined process, in the first processing apparatus, wherein the predetermined process includes a plurality of sub processes performed in a predetermined order, the sub processes each using a processing result of another sub process performed before the sub process as input data, the right information indicates a right of the user of the first processing apparatus to input data for each sub process of the plurality of sub processes, the selecting in the second processing apparatus selects a take-over sub process that is a top of one or more sub processes to be performed by the first processing apparatus, from among a plurality of the sub processes, based on the right information, the performing in the second processing apparatus performs one or more sub processes before the take-over sub process in the predetermined order and the transmitting a processing result in the second processing apparatus transmits input data for the take-over sub process to the first processing apparatus, and the performing in the first processing apparatus performs one or more sub processes from the take-over sub process in the predetermined order using the input data for the take-over sub process that is received from the second processing apparatus.

9. The distributed processing method according to claim 8, wherein, when the user has the right to input data for all of one or more sub processes from one sub process among a plurality of the sub processes, the selecting in the second processing apparatus selects the one sub process as the take-over sub process.

10. The distributed processing method according to claim 8, wherein, when the user has the right to input data for all of one or more sub processes from one sub process among a plurality of the sub processes, the selecting in the second processing apparatus selects one or more sub processes from the one sub process as candidates for the take-over sub process and selects the take-over sub process from among the candidates for the take-over sub process, based on an estimated processing time to perform the plurality of sub processes when each of the candidates for the take-over sub process is selected as the take-over sub process.

11. The distributed processing method according to claim 10, wherein the estimated processing time to perform the plurality of the sub processes is determined based on at least one of a processing time to perform the one or more sub processes before the take-over sub process in the second processing apparatus, a processing time to perform the one or more sub processes from the take-over sub process in the first processing apparatus, and a transfer time of the input data for the take-over sub process from the second processing apparatus to the first processing apparatus.

12. The distributed processing method according to claim 8, further comprising storing, for each of the plurality of the sub processes, a processing program to perform the sub process, in the second processing apparatus, wherein the transmitting a processing result in the second processing apparatus transmits the processing program for each of the one or more sub process to be performed by the first processing apparatus, to the first processing apparatus together with the input data for the take-over sub process, and the performing in the first processing apparatus performs the one or more sub process to be performed by the first processing apparatus, using the processing program received from the second processing apparatus.

13. A non-transitory computer readable storage medium recording thereon a program, causing a computer, for a processing apparatus of an information processing system including the processing apparatus and other processing apparatus, to perform a method comprising:

performing a predetermined process by using input data for the predetermined process that is received from the other processing apparatus when the processing apparatus is selected as an apparatus to perform the predetermined process; and outputting a processing result of the predetermined process, wherein the other processing apparatus selects, in response to a request for the predetermined process from the processing apparatus, the processing apparatus or the other processing apparatus as an apparatus to perform the predetermined process based on right information indicating a right of a user of the processing apparatus to the input data for the predetermined process, transmits the input data for the predetermined process to the processing apparatus when the processing apparatus is selected as an apparatus to perform the predetermined process, and performs the predetermined process by using the input data for the predetermined process and transmits the processing result of the predetermined process to the processing apparatus when the other processing apparatus is selected as an apparatus to performs the predetermined process, wherein the predetermined process includes a plurality of sub processes performed in a predetermined order, the sub processes each using a processing result of another sub process performed before the sub process as input data, the right information indicates a right of the user of the processing apparatus to input data for each sub process of the plurality of sub processes, the selecting in the other processing apparatus selects a take-over sub process that is a top of one or more sub processes to be performed by the processing apparatus, from among a plurality of the sub processes, based on the right information, the performing in the other processing apparatus performs one or more sub processes before the take-over sub process in the predetermined order and the transmitting a processing result in the other processing apparatus transmits input data for the take-over sub process to the processing apparatus, and the performing in the processing apparatus performs one or more sub processes from the take-over sub process in the predetermined order using the input data for the take-over sub process that is received from the other processing apparatus.

14. A non-transitory computer readable storage medium recording thereon a program, causing a computer, for a processing apparatus of an information processing system including other processing apparatus and the processing apparatus, to perform a method comprising:

selecting, in response to a request for a predetermined process from the other processing apparatus, the other processing apparatus or the processing apparatus as an apparatus to perform a predetermined process based on right information indicating a right of a user of the other processing apparatus to input data for the predetermined process; and transmitting the input data for the predetermined process to the other processing apparatus when the other processing apparatus is selected as an apparatus to perform the predetermined process, and performing the predetermined process by using the input data for the predetermined process and transmitting a processing result of the predetermined process to the other processing apparatus when the processing apparatus is selected as an apparatus to perform the predetermined process, wherein the other processing apparatus performs the predetermined process by using the input data for the predetermined process that is received from the processing apparatus when the other processing apparatus is selected as an apparatus to perform the predetermined process, and outputs the processing result of the predetermined process, wherein the predetermined process includes a plurality of sub processes performed in a predetermined order, the sub processes each using a processing result of another sub process performed before the sub process as input data, the right information indicates a right of the user of the processing apparatus to input data for each sub process of the plurality of sub processes, the selecting in the other processing apparatus selects a take-over sub process that is a top of one or more sub processes to be performed by the processing apparatus, from among a plurality of the sub processes, based on the right information, the performing in the other processing apparatus performs one or more sub processes before the take-over sub process in the predetermined order and the transmitting a processing result in the other processing apparatus transmits input data for the take-over sub process to the processing apparatus, and the performing in the processing apparatus performs one or more sub processes from the take-over sub process in the predetermined order using the input data for the take-over sub process that is received from the other processing apparatus.

* * * * *